(12) United States Patent
Yu et al.

(10) Patent No.: US 9,310,635 B2
(45) Date of Patent: Apr. 12, 2016

(54) CURVED LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Guangdong (CN); Yuchun Hsiao, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 103 days.

(21) Appl. No.: 14/374,514

(22) PCT Filed: Jun. 12, 2014

(86) PCT No.: PCT/CN2014/079714
§ 371 (c)(1),
(2) Date: Jul. 24, 2014

(87) PCT Pub. No.: WO2015/180212
PCT Pub. Date: Dec. 3, 2015

(65) Prior Publication Data
US 2015/0346537 A1 Dec. 3, 2015

(51) Int. Cl.
*G02F 1/1333* (2006.01)
(52) U.S. Cl.
CPC ................. *G02F 1/133308* (2013.01)
(58) Field of Classification Search
CPC ....... G02B 6/4452; H04Q 1/023; H04Q 1/08; H04Q 1/155; H05K 5/0204; H05K 5/0217; H05K 7/14; H05K 7/1487; H05K 7/1489; Y10T 29/49826; G02F 1/1333; G02F 1/13308; G02F 1/13305; G02F 1/1335; G02F 1/133504; G02F 1/133602; G02F 2001/133314; G02F 2001/133322
USPC .......... 361/679.02, 679.58, 727, 810, 679.36, 361/728, 825; 248/155.2, 155.3; 349/60, 349/58, 65, 62, 158; 439/153, 328
See application file for complete search history.

(56) References Cited

U.S. PATENT DOCUMENTS

2015/0009635 A1\* 1/2015 Kang ..................... G09F 9/301
361/749

\* cited by examiner

*Primary Examiner* — Thoi Duong
(74) *Attorney, Agent, or Firm* — Andrew C. Cheng

(57) ABSTRACT

The present invention provides a curved liquid crystal display device, which includes a backlight module (1), a mold frame (3) mounted on the backlight module (1), a liquid crystal panel (5) arranged on the mold frame (3), and a bezel (7) that retains the liquid crystal panel (5) on the mold frame (3). The backlight module (1) includes a curved backplane (11) and optical components (13) arranged in the curved backplane (11). The curved backplane (11) includes a bottom board (111) and a bracing (9) mounted to the bottom board (111). The bracing (9) includes a base (91), a pair of guide rails (93) mounted to the base (91), a screw (95) rotatably mounted to the base (91), and a pair of slide blocks (97) that are in engagement with the screw (95) and slidable along the guide rails (93). The bottom board (111) includes a pair of protrusions (113) formed a surface thereof that is in contact engagement with the slide blocks (97) to correspond to the slide blocks (97). The pair of slide blocks (97) are arranged to respectively press against the pair of protrusions (113) so as to cause deformation of the bottom board (111) to form the curved backplane (11).

11 Claims, 7 Drawing Sheets

CURVED LIQUID CRYSTAL DISPLAY DEVICE

BACKGROUND OF THE INVENTION

1. Field of the Invention

The present invention relates to the field of liquid crystal displaying, and in particular to a curved liquid crystal display device.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

A liquid crystal display generally comprises an enclosure, a liquid crystal panel arranged in the enclosure, and a backlight module mounted in the enclosure. The principle of operation of the liquid crystal panel is that liquid crystal molecules are arranged between two parallel glass substrates and a plurality of vertical and horizontal tiny electrical wires are arranged between the two glass substrates and electricity is applied to control the liquid crystal molecules to change direction in order to refract light emitting from the backlight module to pass through a pixel structure formed on the glass substrates to generate a color image. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel and light is homogenized by a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the liquid crystal displaying technology, major manufacturers have marketed curved liquid crystal displays, such as curved televisions, one after another. Generally speaking, the curved liquid crystal displays allow for the best viewing effect from edge to edge, while a regular liquid crystal display has poor capability of displaying at edges of a screen. The curved liquid crystal displays have a screen that is entirely of a curved design to provide a wide full-view image, allowing for the same visual enjoyment at both the central portion and the circumferential portion of the screen and also reducing distortion of off-axis viewing for viewing at a short distance. Further, the curved liquid crystal displays allow a viewer's viewing distance to be extended, achieving better experience of viewing. Thus, compared to the regular liquid crystal displays, the curved liquid crystal displays have advantages, including: (1) brand differentiating, (2) wider viewable angle, and (3) reducing distortion for short distance viewing.

The conventional ways of forming a curved liquid crystal display generally include: (1) mounting a support rack having a specific curve to a backplane to force the backplane to deform into a curve consistent with that of the rack; and (2) directly forming a structure of a curved surface on the backplane. However, the curvature of a liquid crystal display obtained with both of the two ways is fixed and no adjustment is available to suit users' need of watching, whereby the view angle is subjected to undesired constraint and the structure is relatively complicated, making the cost high.

SUMMARY OF THE INVENTION

An object of the present invention is to provide a curved liquid crystal display device, which allows for easy and efficient switch and adjustment of the curvature of a curved liquid crystal display device to enable users to obtain different conditions of displaying during watching to suit different needs so as to improve the appeal of products to the market and make the structure simple and easy to make.

To achieve the above object, the present invention provides a curved liquid crystal display device, which comprises a backlight module, a mold frame mounted on the backlight module, a liquid crystal panel arranged on the mold frame, and a bezel that retains the liquid crystal panel on the mold frame. The backlight module comprises a curved backplane and optical components arranged in the curved backplane. The curved backplane comprises a bottom board and a bracing mounted to the bottom board. The bracing comprises a base, a pair of guide rails mounted to the base, a screw rotatably mounted to the base, and a pair of slide blocks that are in engagement with the screw and slidable along the guide rails. The bottom board comprises a pair of protrusions formed a surface thereof that is in contact engagement with the slide blocks to correspond to the slide block. The pair of slide blocks is arranged to respectively press against the pair of protrusions so as to cause deformation of the bottom board to form the curved backplane.

The curved backplane is made of a material having an excellent property of elasticity.

The curved backplane is made of spring steel or plastics.

The guide rails are made of a material of high stiffness and having strength greater than strength of the curved backplane.

The bracing comprises a pair of mounting pieces arranged at a middle portion. The pair of mounting piece is fixedly mounted to the bottom board.

The mounting pieces each comprise a mounting section and a connection section connected to the mounting section. The mounting section is planar and fixedly attached by a bolt to a central portion of the bottom board. The connection section is fixedly connected to the base or the guide rails.

The pair of slide blocks is respectively set at opposite sides of the mounting pieces. The pair of slide blocks is arranged in opposite directions.

The pair of slide blocks is arranged to be symmetric with respect to the mounting pieces. Each of the slide blocks comprises a guide face that gradually presses against the corresponding protrusion of the bottom board.

The pair of slide blocks gradually and respectively presses against the pair of protrusions from inner sides of the protrusions. The guide faces are curved surfaces or slope surfaces that are arranged to face the protrusions.

Each of the guide rails has a cross section that is in the form of an inverted L-shape and comprises a planar guide section. The guide sections of the pair of guide rails oppose each other. The slide blocks comprise a pair of slide channels formed therein to be respectively in sliding engagement with the guide sections of the guide rails. Each of the slide blocks comprises a threaded hole formed therein to mate the screw, whereby rotation of the screw causes the pair of slide blocks to slide in opposite directions.

The present invention also provides a curved liquid crystal display device, which comprises a backlight module, a mold frame mounted on the backlight module, a liquid crystal panel arranged on the mold frame, and a bezel that retains the liquid crystal panel on the mold frame, the backlight module comprising a curved backplane and optical components arranged in the curved backplane, the curved backplane comprising a bottom board and a bracing mounted to the bottom board, the bracing comprising a base, a pair of guide rails mounted to the base, a screw rotatably mounted to the base, and a pair of slide blocks that are in engagement with the screw and slidable along the guide rails, the bottom board comprising a pair of protrusions formed a surface thereof that is in contact engagement with the slide blocks to correspond to the slide block, the pair of slide blocks being arranged to respectively press against the pair of protrusions so as to cause deformation of the bottom board to form the curved backplane;

wherein the curved backplane is made of a material having an excellent property of elasticity;

wherein the curved backplane is made of spring steel or plastics;

wherein the guide rails are made of a material of high stiffness and having strength greater than strength of the curved backplane;

wherein the bracing comprises a pair of mounting pieces arranged at a middle portion, the pair of mounting piece being fixedly mounted to the bottom board;

wherein the mounting pieces each comprise a mounting section and a connection section connected to the mounting section, the mounting section being planar and fixedly attached by a bolt to a central portion of the bottom board, the connection section being fixedly connected to the base or the guide rails;

wherein the pair of slide blocks is respectively set at opposite sides of the mounting pieces, the pair of slide blocks being arranged in opposite directions;

wherein the pair of slide blocks is arranged to be symmetric with respect to the mounting pieces, each of the slide blocks comprising a guide face that gradually presses against the corresponding protrusion of the bottom board;

wherein the pair of slide blocks gradually and respectively presses against the pair of protrusions from inner sides of the protrusions, the guide faces being curved surfaces or slope surfaces that are arranged to face the protrusions; and wherein each of the guide rails has a cross section that is in the form of an inverted L-shape and comprises a planar guide section, the guide sections of the pair of guide rails opposing each other, the slide blocks comprising a pair of slide channels formed therein to be respectively in sliding engagement with the guide sections of the guide rails, each of the slide blocks comprising a threaded hole formed therein to mate the screw, whereby rotation of the screw causes the pair of slide blocks to slide in opposite directions.

The efficacy of the present invention is that the present invention provides a curved liquid crystal display device, which comprises a bracing, which is made up of a screw, guide rails, and a pair of slide blocks, mounted to a bottom board of a curved backplane and comprises a pair of protrusions formed on the bottom board to correspond to the pair of slide blocks, whereby through rotation of the screw to drive the pair of slide blocks to press against or release the corresponding protrusions, the bottom board of the curved backplane is caused to change curvature thereof so as to achieve easy and efficient adjustment of the curvature of the curved liquid crystal display device, improve product appeal to the market, and provide a simple structure for easy manufacture.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
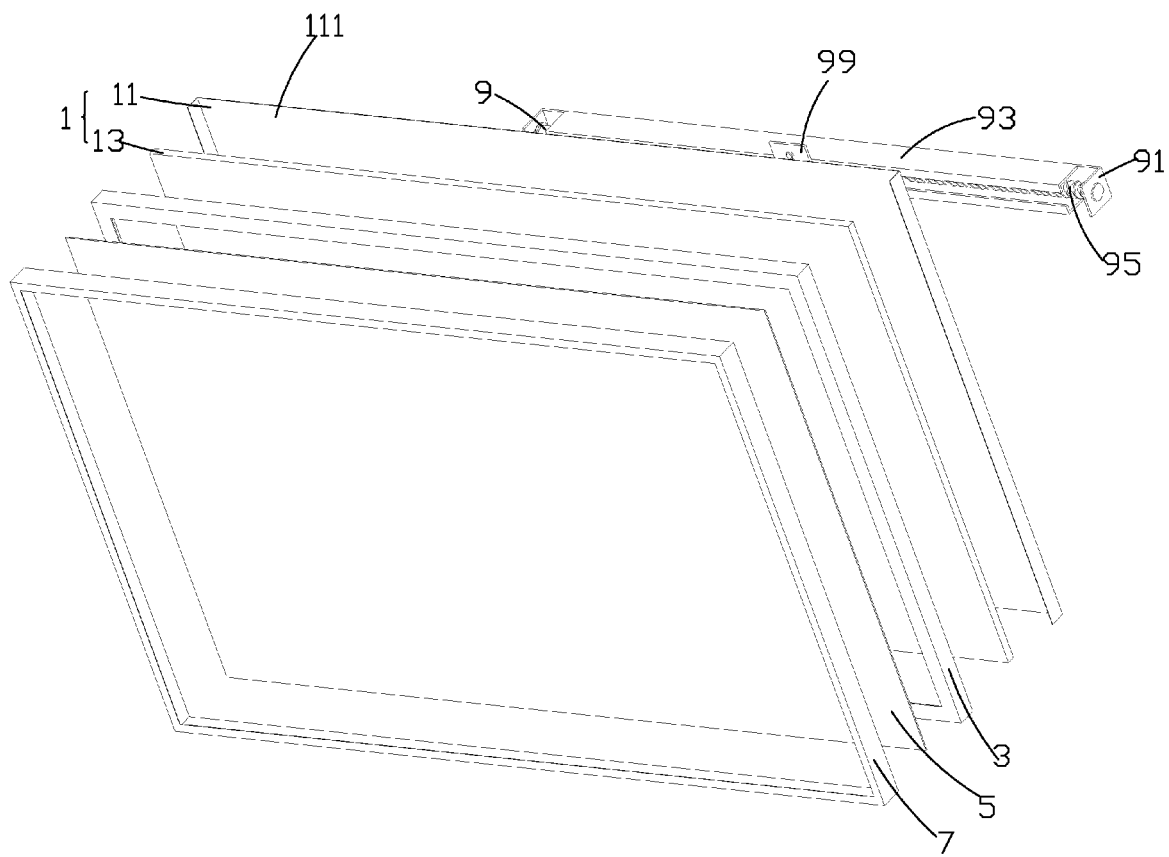
FIG. 1 is an exploded view of a curved liquid crystal display device according to the present invention.
Figure 2:
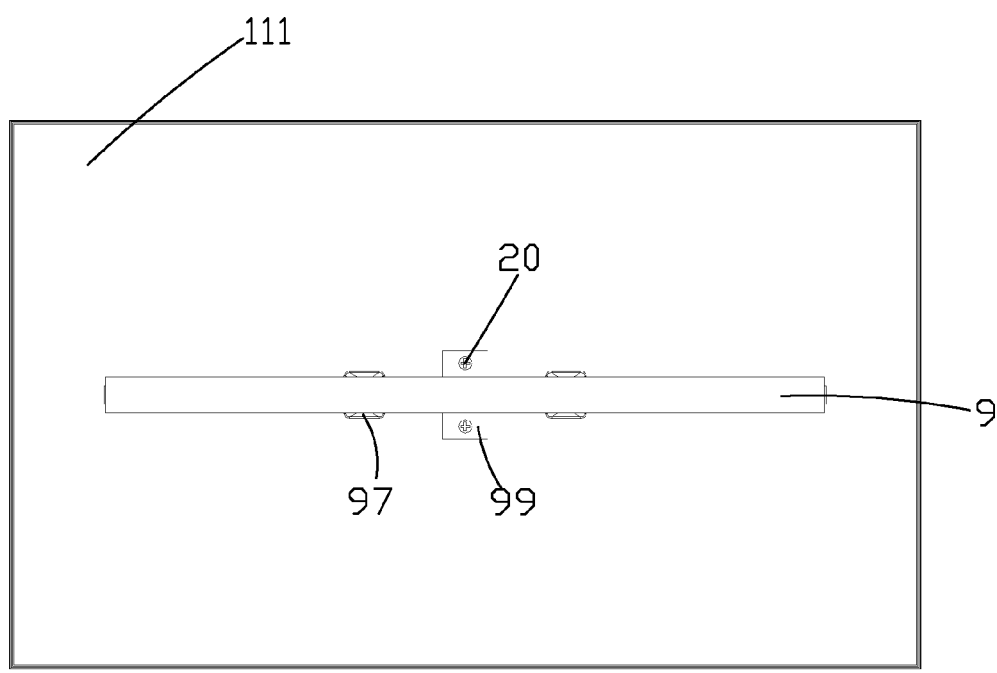
FIG. 2 is a rear view of the curved liquid crystal display device according to the present invention.

To further expound the technical solution adopted in the present invention and the advantages thereof, a detailed description is given to a preferred embodiment of the present invention and the attached drawings.

Referring to FIGS. 1-10, the present invention provides a curved liquid crystal display device, which comprises a backlight module 1, a mold frame 3 mounted on the backlight module 1, a liquid crystal panel 5 arranged on the mold frame 3, and a bezel 7 that retains the liquid crystal panel 5 on the mold frame 3. The backlight module 1 comprises a curved backplane 11 and optical components 13 arranged in the curved backplane 11. The curved backplane 11 comprises a bottom board 111 and a bracing 9 mounted to the bottom board 111. The bracing 9 comprises a base 91, a pair of guide rails 93 mounted to the base 91, a screw 95 rotatably mounted to the base 91, and a pair of slide blocks 97 that are in engagement with the screw 95 and slidable along the guide rails 93. The bottom board 111 comprises a pair of protrusions 113 formed a surface thereof that is in contact engagement with the slide blocks 97 to correspond to the slide blocks 97. The pair of slide blocks 97 are arranged to respectively press against the pair of protrusions 113 so as to cause deformation of the bottom board 111 to form the curved backplane 11.

The curved backplane 11 is made of a material having excellent property of elasticity and is preferably made of spring steel or plastics, allowing for easy occurrence of elastic deformation and restoration.

The guide rails 93 are made of a material having great stiffness and having strength greater than the strength of the curved backplane 11.

The pair of protrusions 113 are arranged to be symmetric with respect to a center of the bottom board 111. Each of the protrusions 113 has a protruding height that is increased from a side thereof close to the center of the bottom board 111, namely the inner side, to a side thereof away from the center of the bottom board 111, namely the outer side.

The bracing 9 further comprises a pair of mounting pieces 99 formed at a middle portion thereof. The pair of mounting pieces 99 is fixedly mounted to the bottom board 111.

Specifically, the mounting pieces 99 each comprise a mounting section 991 and a connection section 993 connected to the mounting section 991. The mounting section 991 is planar and is fixedly attached by a bolt 20 to a central portion of the bottom board 111. The connection section 993 is fixedly connected to the base 91 or the guide rails 93. Further, the connection section 993 can be fixed connected to the base 91 or the guide rails 93 by means of welding or screwing.

The pair of slide blocks 97 is respectively set at opposite sides of the mounting pieces 99 and is symmetric with respect to the mounting pieces 99. It is particularly noted that the pair of slide blocks 97 is arranged to be respectively in opposite directions so that when the screw 95 is rotated, the pair of slide blocks 97 moves in opposite directions along the guide rails 93. Each of the slide blocks 97 comprises a guide face 971. The guide face 971 is a curved surface or a slope surface arranged to face the corresponding one of the protrusions 113. When the screw 95 is rotated, the pair of slide blocks 97 are caused to slide along the guide rails 93 in opposite directions and the guide faces 971 respectively and gradually press the pair of protrusions 113 from the inner sides of the protrusions 113 so as to force the bottom board 111 to curve.

Each of the guide rails 93 has a cross section in the form of an inverted L-shape and comprises a planar guide section 931. The guide sections 931 of the pair of guide rails 93 are arranged to oppose each other. The slide blocks 97 are each provided with a pair of slide channels 973 that are respectively set in sliding engagement with the guide sections 931 of the guide rails 93. Each of the slide blocks 97 comprises a threaded hole 975 formed therein to mate the screw 95, whereby rotation of the screw 95 would cause the pair of slide blocks 97 to slide in opposite directions.

The screw 95 can be rotated manually or can be rotated automatically by being equipped with a power source (not shown), such as an electrical motor or a hydraulic motor. Preferably, the screw 95 is rotated automatically by being equipped with a power source, such as an electrical motor or a hydraulic motor.

Figure 3:
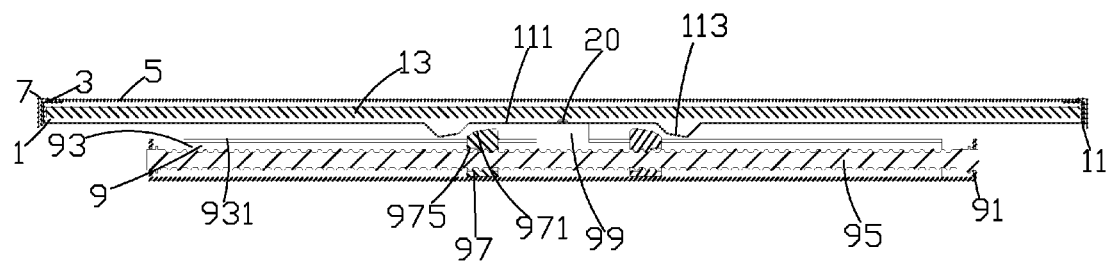
FIG. 3 is a cross-sectional view showing a curved backplane of the curved liquid crystal display device of the present invention in an un-curved condition.
Figure 4:
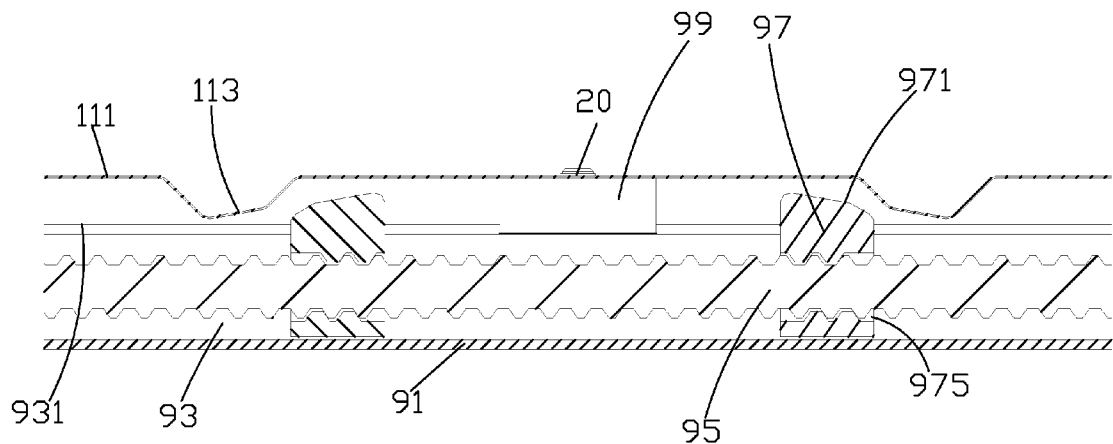
FIG. 4 is a partial enlarged view showing a middle portion of a bottom board and a bracing of the curved backplane of FIG. 3.
Figure 5:
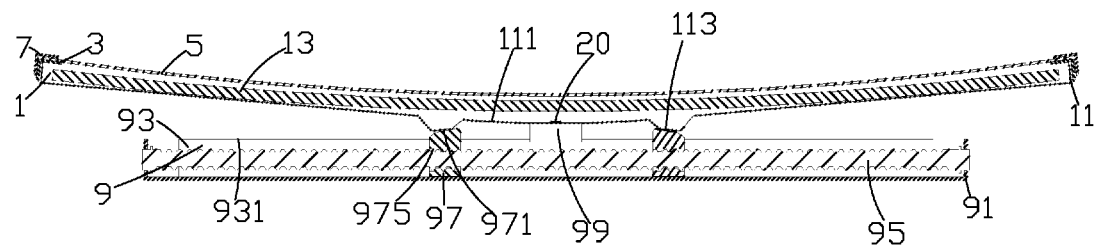
FIG. 5 is a cross-sectional view showing a curved backplane of the curved liquid crystal display device of the present invention in a curved condition.
Figure 6:
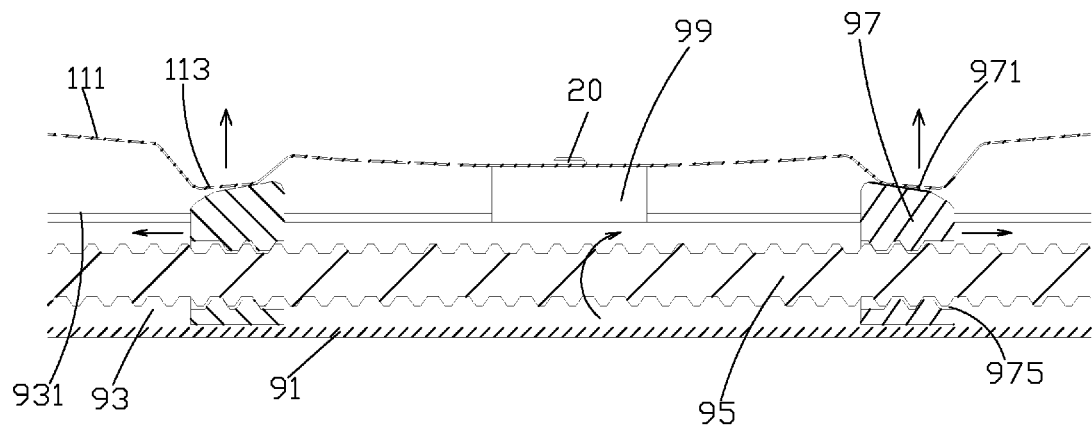
FIG. 6 is a partial enlarged view showing a middle portion of the bottom board and the bracing of the curved backplane of FIG. 5.
Figure 7:
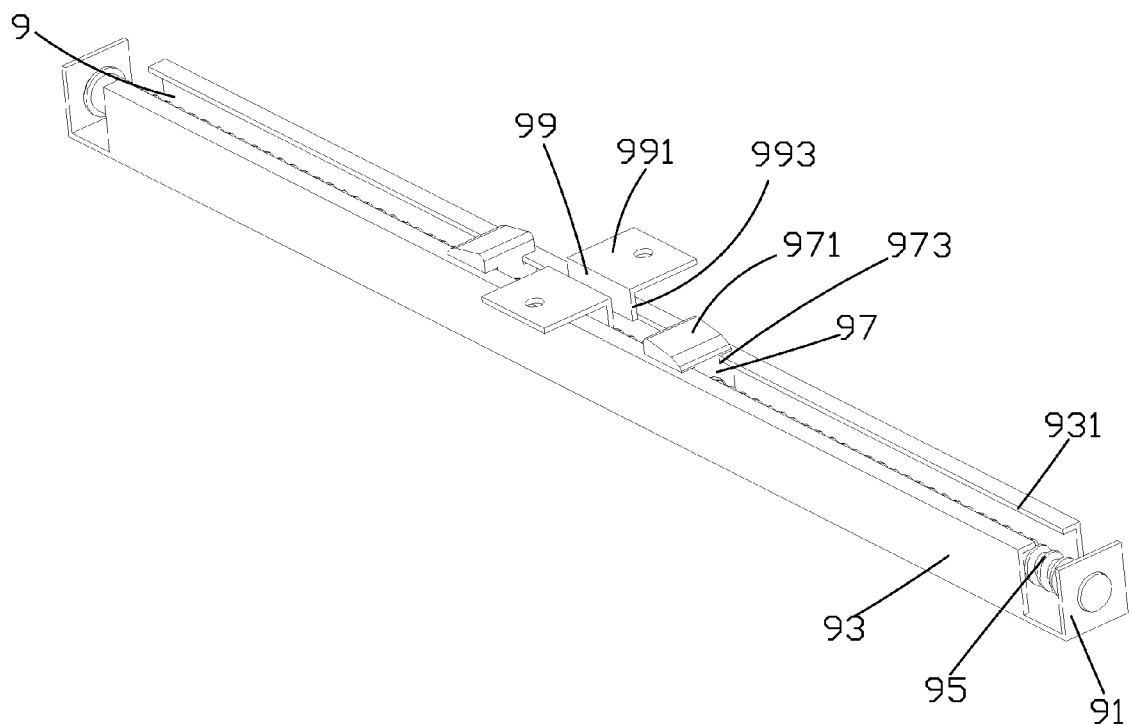
FIG. 7 is a perspective view showing the bracing of the curved liquid crystal display device according to the present invention.
Figure 8:
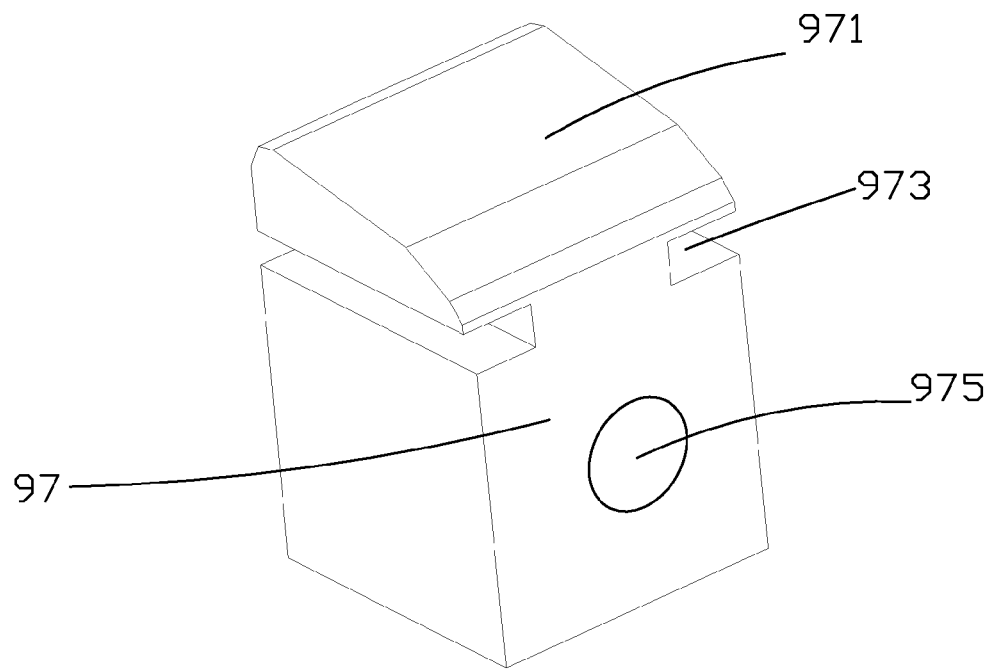
FIG. 8 is a perspective view showing a slide block of the curved liquid crystal display device according to the present invention.
Figure 9:
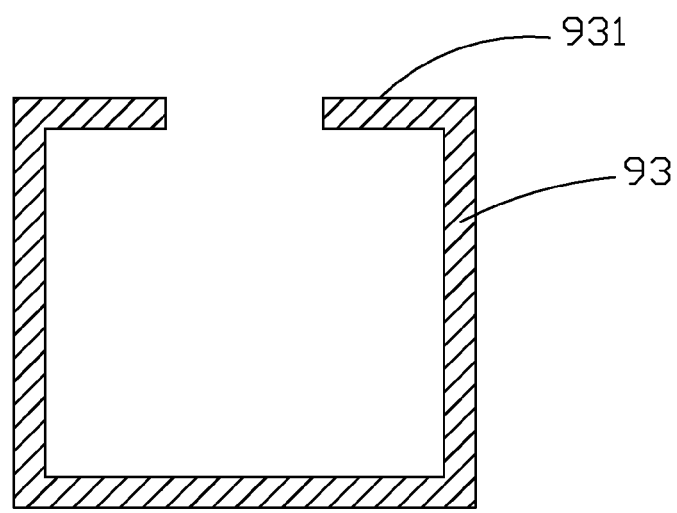
FIG. 9 is a cross-sectional view showing a slide rail of the curved liquid crystal display device according to the present invention.
Figure 10:
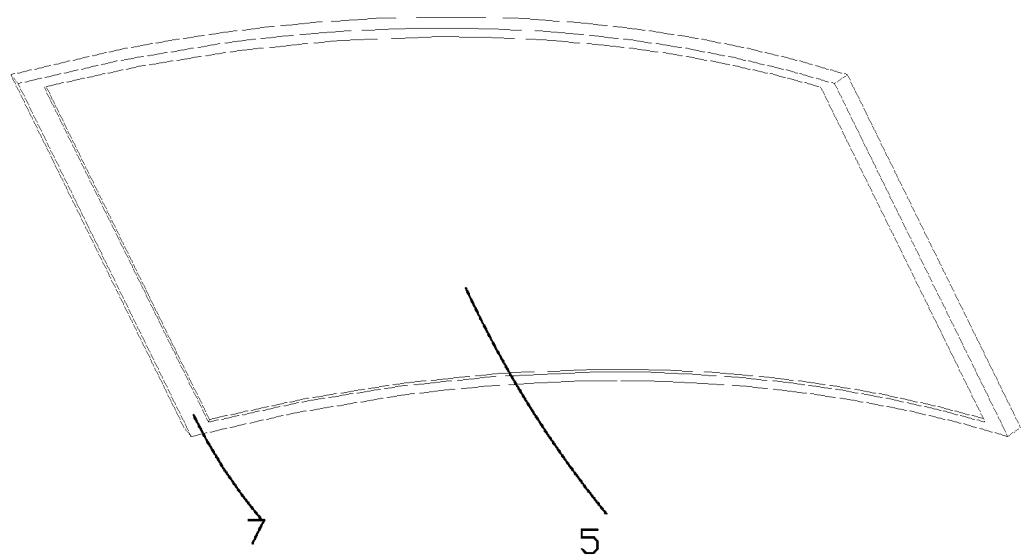
FIG. 10 is a perspective view showing the curved liquid crystal display device according to the present invention in a condition of the curved backplane being in a curved state.

In FIGS. 3 and 4, the curved backplane 11 is shown in an un-curved condition and is thus in a planar form. Under this condition, the curved liquid crystal display device may serve as a flat panel liquid crystal display device. When the power source is activated to drive the screw 95 to rotate, as shown in FIGS. 5 and 6, the pair of slide blocks 97 that mates the screw 95 is caused to slide along the guide rails 93 in opposite directions to gradually approach the corresponding pair of protrusions 113 formed on the bottom board 111 until the guide faces 971 start to gradually press the corresponding protrusions 113 from the inner sides of the pair of protrusions 113. Since the mounting sections 991 of the mounting pieces 99 are fixedly mounted by the bolts 20 to the central portion of the bottom board 111 and since the guide rails 93 are made of a material having stiffness and strength greater than those of the material of the curved backplane 11, under the condition that the guide faces 971 press against the protrusions 113, the bottom board 111 is caused to curve. The greater the number of the turns that the screw 95 is rotated, the greater the extent that the guide faces 971 press against the protrusions 113, and thus, the curvature of the bottom board 111 is made greater. As shown in FIG. 10, other components of a curved liquid crystal display device are arranged to show overall curving in order to match the curving of the bottom board 111 of the curved backplane 11 and the curvature thereof varies with the number of turns that the screw 95 is rotated, whereby a user may conduct an easy and efficient adjustment of the curvature of the curved liquid crystal display device to suit the need for watching.

Similarly, by rotating the screw 95 in an opposite direction, the pair of slide blocks 97 that mates the screw 95 is caused to slide along the guide rails 93 in opposite directions and gradually move away from the corresponding pair of protrusions 113 formed on the bottom board 111, so that the guide faces 971 gradually release the corresponding protrusions 113 to thereby release the bottom board 111 and reduce the curvature of the curved liquid crystal display device to eventually reach a planar form.

In summary, the present invention provides a curved liquid crystal display device, which comprises a bracing, which is made up of a screw, guide rails, and a pair of slide blocks, mounted to a bottom board of a curved backplane and comprises a pair of protrusions formed on the bottom board to correspond to the pair of slide blocks, whereby through rotation of the screw to drive the pair of slide blocks to press against or release the corresponding protrusions, the bottom board of the curved backplane is caused to change curvature thereof so as to achieve easy and efficient adjustment of the curvature of the curved liquid crystal display device, improve product appeal to the market, and provide a simple structure for easy manufacture.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curved liquid crystal display device, comprising a backlight module, a mold frame mounted on the backlight module, a liquid crystal panel arranged on the mold frame, and a bezel that retains the liquid crystal panel on the mold frame, the backlight module comprising a curved backplane and optical components arranged in the curved backplane, the curved backplane comprising a bottom board and a bracing mounted to the bottom board, the bracing comprising a base, a pair of guide rails mounted to the base, a screw rotatably mounted to the base, and a pair of slide blocks that are in engagement with the screw and slidable along the guide rails, the bottom board comprising a pair of protrusions formed a surface thereof that is in contact engagement with the slide blocks to correspond to the slide blocks, the pair of slide blocks being arranged to respectively press against the pair of protrusions so as to cause deformation of the bottom board to form the curved backplane.

2. The curved liquid crystal display device as claimed in claim 1, wherein the curved backplane is made of a material having an excellent property of elasticity.

3. The curved liquid crystal display device as claimed in claim 2, wherein the curved backplane is made of spring steel or plastics.

4. The curved liquid crystal display device as claimed in claim 1, wherein the guide rails are made of a material of high stiffness and having strength greater than strength of the curved backplane.

5. The curved liquid crystal display device as claimed in claim 1, wherein the bracing comprises a pair of mounting pieces arranged at a middle portion, the pair of mounting piece being fixedly mounted to the bottom board.

6. The curved liquid crystal display device as claimed in claim 5, wherein the mounting pieces each comprise a mounting section and a connection section connected to the mounting section, the mounting section being planar and fixedly attached by a bolt to a central portion of the bottom board, the connection section being fixedly connected to the base or the guide rails.

7. The curved liquid crystal display device as claimed in claim 5, wherein the pair of slide blocks is respectively set at opposite sides of the mounting pieces, the pair of slide blocks being arranged in opposite directions.

8. The curved liquid crystal display device as claimed in claim 7, wherein the pair of slide blocks is arranged to be symmetric with respect to the mounting pieces, each of the slide blocks comprising a guide face that gradually presses against the corresponding protrusion of the bottom board.

9. The curved liquid crystal display device as claimed in claim 8, wherein the pair of slide blocks gradually and respectively presses against the pair of protrusions from inner sides of the protrusions, the guide faces being curved surfaces or slope surfaces that are arranged to face the protrusions.

10. The curved liquid crystal display device as claimed in claim 1, wherein each of the guide rails has a cross section that is in the form of an inverted L-shape and comprises a planar guide section, the guide sections of the pair of guide rails opposing each other, the slide blocks comprising a pair of slide channels formed therein to be respectively in sliding engagement with the guide sections of the guide rails, each of the slide blocks comprising a threaded hole formed therein to mate the screw, whereby rotation of the screw causes the pair of slide blocks to slide in opposite directions.

11. A curved liquid crystal display device, comprising a backlight module, a mold frame mounted on the backlight module, a liquid crystal panel arranged on the mold frame, and a bezel that retains the liquid crystal panel on the mold frame, the backlight module comprising a curved backplane and optical components arranged in the curved backplane, the curved backplane comprising a bottom board and a bracing mounted to the bottom board, the bracing comprising a base, a pair of guide rails mounted to the base, a screw rotatably mounted to the base, and a pair of slide blocks that are in engagement with the screw and slidable along the guide rails, the bottom board comprising a pair of protrusions formed a surface thereof that is in contact engagement with the slide blocks to correspond to the slide blocks, the pair of slide blocks being arranged to respectively press against the pair of protrusions so as to cause deformation of the bottom board to form the curved backplane;

wherein the curved backplane is made of spring steel or plastics;

wherein the guide rails are made of a material of high stiffness and having strength greater than strength of the curved backplane;

wherein the bracing comprises a pair of mounting pieces arranged at a middle portion, the pair of mounting piece being fixedly mounted to the bottom board;

wherein the mounting pieces each comprise a mounting section and a connection section connected to the mounting section, the mounting section being planar and fixedly attached by a bolt to a central portion of the bottom board, the connection section being fixedly connected to the base or the guide rails;

wherein the pair of slide blocks is respectively set at opposite sides of the mounting pieces, the pair of slide blocks being arranged in opposite directions;

wherein the pair of slide blocks is arranged to be symmetric with respect to the mounting pieces, each of the slide blocks comprising a guide face that gradually presses against the corresponding protrusion of the bottom board;

wherein the pair of slide blocks gradually and respectively presses against the pair of protrusions from inner sides of the protrusions, the guide faces being curved surfaces or slope surfaces that are arranged to face the protrusions; and wherein each of the guide rails has a cross section that is in the form of an inverted L-shape and comprises a planar guide section, the guide sections of the pair of guide rails opposing each other, the slide blocks comprising a pair of slide channels formed therein to be respectively in sliding engagement with the guide sections of the guide rails, each of the slide blocks comprising a threaded hole formed therein to mate the screw, whereby rotation of the screw causes the pair of slide blocks to slide in opposite directions.

* * * * *